United States Patent Office 2,778,983
Patented Jan. 22, 1957

2,778,983

LOAD CURRENT AND VOLTAGE CONTROL MEANS FOR ELECTRICAL SYSTEMS

William H. Elliot, Whitefish Bay, Wis., assignor to Cutler-Hammer, Inc., Milwaukee, Wis., a corporation of Delaware Application September 2, 1955, Serial No. 532,151

5 Claims. (Cl. 318—331)

This invention relates to load current and voltage control means for systems in which a load is supplied with unidirectional current from an alternating current source; and the primary object of the invention is to provide improved load current and voltage control means for such systems.

Another object of the invention is to provide improved voltage control and current limit means for electronic motor drives.

These and other objects and advantages of the invention which will hereinafter appear, are realized in part by the provision of a novel current limit circuit and reference voltage circuit and combination of the current limit and reference voltage circuit with other control and feedback circuits, to control conduction in a thyratron tube. Certain embodiments of the invention are illustrated in the accompanying drawing. It is to be understood that various modifications may be made in the embodiments illustrated and that other embodiments are possible to be made without departing from the spirit of the invention or the scope of the appended claims.

Figure 1:
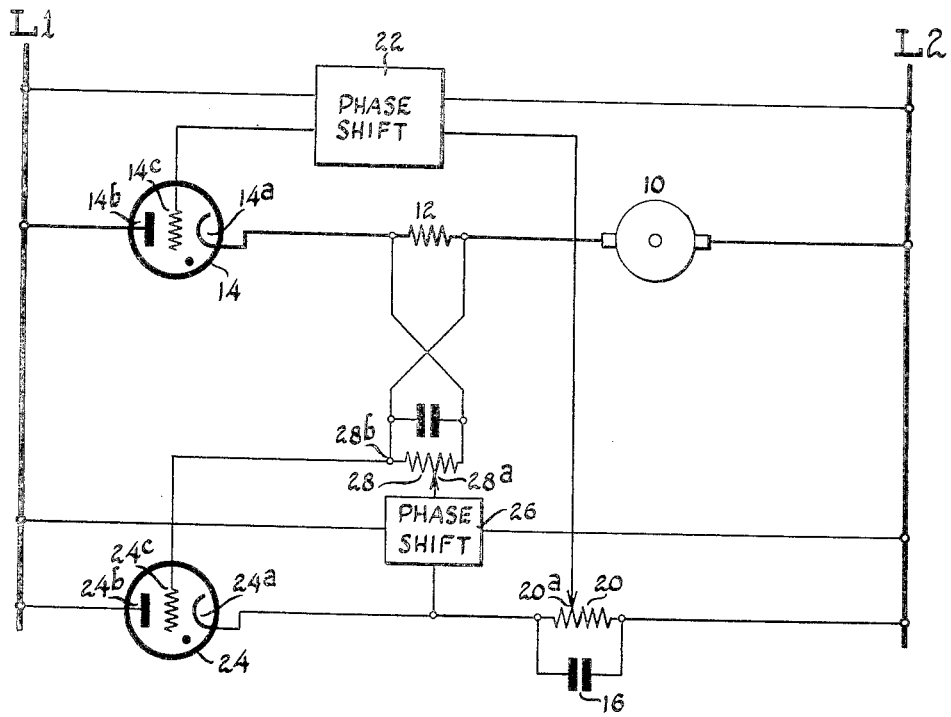
Figure 1 illustrates diagrammatically a system embodying the invention.

Referring to Fig. 1, the system there shown is intended to control the voltage applied to a motor armature 10 and to limit the average current which may flow to armature 10.

Lines L1 and L2 represent a source of alternating current across which the armature 10 is connected in series with a resistor 12 and the cathode $14^a$ and anode $14^b$ of a thyratron tube 14. The voltage applied to armature 10 is varied by variation of the voltage applied between cathode $14^a$ and control electrode $14^c$ of the thyratron whereby the period of tube conduction during alternate half cycles of the supply wave is varied.

The cathode-control electrode circuit of thyratron 14 may be traced from cathode $14^a$ through resistor 12 and armature 10 to line L2, from line L2 through a portion of voltage divider 20 to tap $20^a$, and thence through a source of phase-shifted alternating bias voltage 22 to control electrode $14^c$.

Thus the voltage across the armature is applied as a feedback voltage in series with the voltage across voltage divider 20 to tap $20^a$ or reference voltage and the alternating bias voltage between the control electrode and cathode of thyratron 14.

The reference voltage remains substantially unchanged, after tap $20^a$ is adjusted, unless the current to armature 10 exceeds a predetermined limit. The alternating bias voltage output lags the voltage between lines L1 and L2 by about one hundred electrical degrees and is of constant magnitude.

In the circuit thus far described, the firing angle of thyratron 14 depends upon the time during the supply cycle when the alternating bias voltage rises above the critical firing voltage of tube 14. In turn this time is determined by the algebraic sum of the feedback and reference voltages and is adjusted by adjustment of tap $20^a$ to change the reference voltage.

The voltage drop across voltage divider 20, and so the reference voltage for thyratron 14, is determined by the firing angle or portion of the supply power cycle during which thyratron 24 is made conductive. Divider 20 is connected in parallel with a filter capacitor 16 in series with the cathode $24^a$ and anode $24^b$ of tube 24 from line L2 to line L1. The firing angle of this tube is determined by the voltage applied between cathode $24^a$ and control electrode $24^b$ as illustrated in Figs. 2 and 3.

The latter voltage comprises an alternating bias voltage and a unidirectional control voltage which are developed in a phase shift network 26 and voltage divider 28, respectively. The network 26 and divider 28, from tap $28^a$ to end $28^b$, are connected in series between cathode $24^a$ and control electrode $24^c$. Divider 28 is connected in parallel with resistor 12 so that the voltage drop across it is proportional to the average current in armature 10.

Figure 2:
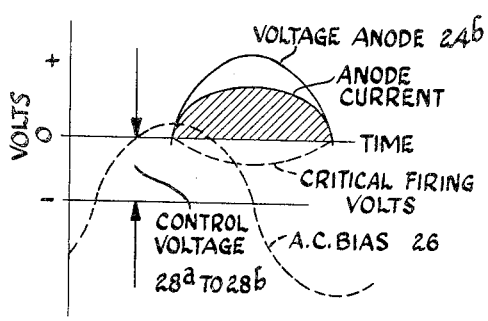
Figs. 2 and 3 illustrate graphically different operating conditions in the system of Fig. 1.

Referring to Fig. 2, the alternating bias voltage leads the anode voltage of tube 24 by approximately ninety electrical degrees so that tube 24 is normally fired or conductive for a one hundred and eighty degree period. When the control voltage measured from $28^a$ to $28^b$ exceeds a value corresponding to maximum allowable average current in armature 10, thyratron 24 is turned off as illustrated in Fig. 3. Current flow in thyratron 24 ceases so that the reference voltage across voltage divider 20 to tap $20^a$ becomes zero and thyratron 14 is turned off. Then no current flows in resistor 12 and tube 24 is turned on and the process is repeated if armature 10 is stalled or turns slowly, to limit average armature current to a safe value.

Figure 3:
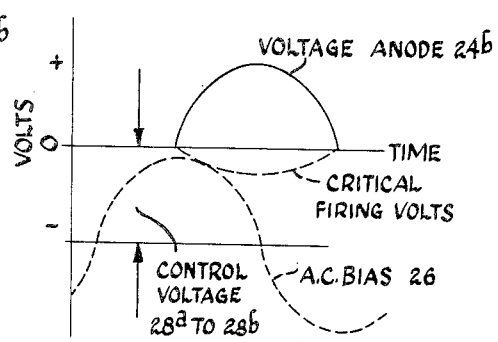

However, it may be seen from inspection of Fig. 3, that as the control voltage increases beyond a value equal to the peak magnitude of the alternating bias voltage, thyratron 24 will conduct initially for less than one hundred and eighty degrees and conduction will not stop completely until, in Fig. 3, the alternating bias voltage no longer intersects the critical firing voltage line of tube 24. As the cut-off point is approached, conduction in thyratron 24 becomes proportional, over a range of a few degrees, to current in armature 10. Thus when the motor is temporarily overloaded a small amount, armature current is limited without actually stopping conduction in thyratron 24. The range of this action may be varied by varying the amount by which alternating bias voltage leads the anode voltage in tube 24 through the range from about ninety to one hundred and twenty electrical degrees.

Figure 4:
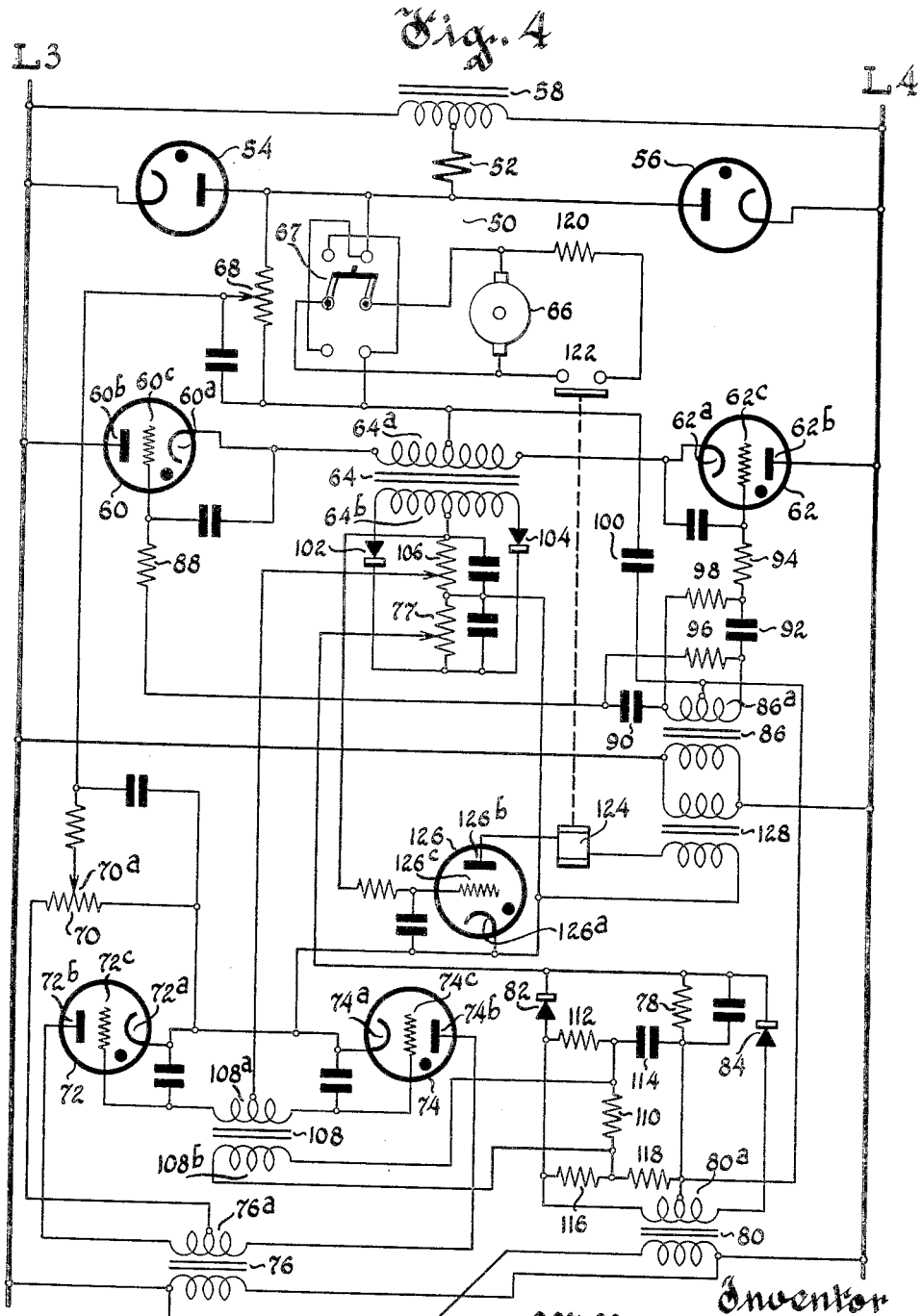
Fig. 4 illustrates diagrammatically another control system embodying the invention.

Fig. 4 illustrates a system of the type shown in Fig. 1 with less simplification. The purpose of the system is to control the speed of a shunt motor 50. Power for the motor field winding 52 is supplied by a full-wave rectifier comprising gas filled diode tubes 54 and 56, connected in series between alternating current supply lines L3 and L4, and a reactor 58, connected between lines L3 and L4. Field winding 52 is connected from the center tap of reactor 58 to a common connection between the anodes of diodes 54 and 56.

A pair of thyratrons 60 and 62 having anodes $60^b$ and $62^b$, cathodes $60^a$ and $62^a$ and control electrodes $60^c$ and $62^c$, respectively, are connected in series with the primary winding $64^a$ of a current transformer 64. This circuit may be traced from line L3 to anode $60^b$, from cathode 60a through winding 64a to cathode 62a and from anode 62b to line L4.

Armature 66 of motor 50 is connected through a reversing switch 67 from the common anode connection of diodes 54 and 56 to the centertap of winding 64a. Thus tubes 54, 56, 60 and 62 form a bridge rectifier for supplying unidirectional power to armature 66. Conduction in thyratrons 60 and 62 is varied to vary the voltage applied to armature 66 by changing the voltage applied between the control electrode and cathode of each thyratron.

This voltage comprises: a unidirectional feedback voltage which is proportional to the voltage applied to armature 66; a unidirectional reference voltage which is adjustable and after adjustment remains constant unless armature current exceeds a preselected value; a unidirectional IR compensation voltage; a constant unidirectional bias voltage; and two alternating bias voltages which are of like amplitude, are applied to thyratrons 60 and 62, respectively, and which lead and lag the L3—L4 supply voltage by a like amount.

The feedback voltage is measured between the lower end and the tap of a voltage divider 68 which is connected in parallel with armature 66 and reversing switch 67.

The reference voltage is measured across that portion of voltage divider 70 from the tap to the common cathode connection of a pair of auxiliary thyratrons 72 and 74. These thyratrons comprise cathodes 72a and 74a, anodes 72b and 74b and control electrodes 72c and 74c, respectively. The anodes 72b and 74b are connected to opposite ends of the secondary winding 76a of a power transformer 76. Voltage divider 70 is connected between the center tap of winding 76a and cathodes 72a and 72b and is the load for the full-wave rectifier formed by thyratrons 72 and 74 and power transformer 76.

The IR compensation voltage is measured in a voltage divider 77 from the tap to the junction point between voltage dividers 77 and 106. A voltage proportional to motor armature current is induced in secondary winding 64b of current transformer 64. The ends of winding 64b are connected together through the series combination of rectifiers 102 and 104 to form a full-wave rectifier in which voltage dividers 106 and 77 are connected in series from the centertap of winding 64b to the junction between the rectifiers 102 and 104.

The unidirectional bias voltage is measured across resistor 78 which is the load resistor of a full-wave rectifier comprising power transformer 80 and half-wave rectifiers 82 and 84.

The alternating bias voltages are measured in a dual phase-shift network comprising a supply transformer 86 whose secondary winding 86a is center tapped. The network may be traced from control electrode 60c through a limiting resistor 88, a capacitor 90, secondary winding 86a, a capacitor 92 and a limiting resistor 94 to control electrode 62c. A resistor 96 is shunted across the series combination of capacitor 90 and winding 86a and a resistor 98 is shunted across the series combination of winding 86a and capacitor 92. A capacitor 100 is connected between the centertaps of transformer windings 86a and 64a to provide an alternating current return path through winding 64a to cathodes 60a and 62a. By this network, alternating bias voltages which lag their respective anode voltages by about one hundred electrical degrees are applied between the control electrodes and cathodes of each of thyratrons 60 and 62.

In the system thus far described, the speed of motor 50 will be regulated at a value determined by the magnitude of the reference voltage across voltage divider 70 from the tap of cathodes 72a and 74a. The feedback voltage, which is a measure of actual motor speed, is opposed by the reference voltage. If the feedback voltage is less than the reference voltage (neglecting the effect of the constant unidirectional bias voltage) the voltage difference between the feedback and reference voltages has polarity to make thyratrons 60 and 62 more conductive.

Conversely, if the motor speed exceeds the desired value, the feedback voltage exceeds the reference voltage and the resultant voltage renders thyratrons 60 and 62 less conductive.

The reference voltage may be adjusted by adjustment of the tap of voltage divider 70. Except that it may be so adjusted, it remains constant during normal operation of the system. However, if the armature current exceeds a preselected value, thyratrons 72 and 74 are made non-conductive, the reference voltage approaches zero and the main thyratrons 60 and 62 are made non-conductive. Then, because current flow in transformer 64 stops, thyratrons 72 and 74 are turned on. This action is repeated to limit average armature current to a safe value until the motor overload is removed.

As previously described, the voltage induced in secondary winding 64b of current transformer 64 is proportional to the magnitude of the current supplied to armature 66. The induced current is rectified in half-wave rectifiers 102 and 104 and impressed across voltage dividers 106 and 77. The lower or positive end of the voltage divider 106 is connected to cathodes 72a and 74a. The tap of 106 is connected to the center tap of the secondary winding 108a of a transformer 108. The ends of winding 108a are connected to control electrodes 72c and 74c, respectively.

The primary winding 108b of the transformer 108 is connected across a resistor 110 in a phase shift circuit. This circuit comprises one half of the secondary winding 80a of transformer 80 which is connected across a parallel circuit one leg of which includes the series combination of a resistor 112 and capacitor 114 and the other leg of which includes resistors 116 and 118 connected in series. The resistor 110 is connected from the junction between resistor 112 and capacitor 114 to the junction between resistors 116 and 118.

The alternating voltages induced in the respective halves of secondary winding 108a lead the anode voltage of the associated one of thyratrons 72 and 74 by about ninety electrical degrees. Thus the operation of each of these thyratrons is like that shown in Figs. 2 and 3 and described in connection with thyratron 24 of Fig. 1.

A dynamic braking resistor 120 is connected in series with a normally open contact 122 across armature 66. The contact is operated by a coil 124 to provide "quick slow down" of motor 50 by dynamic braking. Coil 124 is connected in series a series circuit extending from anode 126b of a thyratron 126, through coil 124, the secondary winding of power transformer 128 and the thyratron cathode 126a. Cathode 126a is also connected to the positive end of voltage divider 106. The negative end of the latter is connected to the control electrode 126c of thyratron 126.

When armature current, as measured in voltage divider 106, is reduced below a given value, the voltage in resistor 77 and 106 will diminish and thyratron 126 will fire, coil 124 will be energized to close contacts 122 and establish the dynamic braking circuit through resistor 120. As the motor reaches the reduced speed called for by change in position of tap 70a of divider 70, armature current will again flow, a voltage drop will appear across divider 106 and conduction through tube 126 will be cut off, dropping out relay 124 and opening the dynamic braking circuit.

I claim:

1. In combination: a control system comprising an electrical load, a thyratron connected to apply unidirectional current to the load from an alternating current source, means to provide a feedback voltage proportional to load voltage, means to provide a reference voltage and circuit means to compare said feedback and reference voltages and to apply a voltage proportional to the difference therebetween to the control electrode and cathode of the thyratron to control conductivity of the latter; means to measure the current supplied to the load and to provide a control voltage proportional thereto; and means sensitive to said control voltage and acting when said control voltage attains a selected magnitude to interrupt provision of said reference voltage.

2. The combination defined in claim 1 in which said load comprises the armature of a direct current motor and in which said feedback voltage proportional to load voltage varies as a function of the speed of the motor.

3. The combination defined in claim 1 in which said means to provide a reference voltage comprises a load element connected in the control electrode-cathode circuit of said thyratron and a second thyratron to supply unidirectional current to the load element from said alternating current source, and said means sensitive to said control voltage comprises the control electrode-cathode circuit of said second thyratron.

4. In combination: a control system comprising an electrical load, a first thyratron connected to apply unidirectional current to the load from an alternating current source, a voltage divider connected across said load to provide a feedback voltage proportional to the voltage across said load, a resistance element and a second thyratron connected in series with said resistance element for applying unidirectional current to said resistance element from said alternating current source, said voltage divider and said resistance element having connection in series between the control electrode and cathode of said first thyratron such that the voltage across said voltage divider is opposed by the voltage across said resistance element; means to measure the current supplied to said load and to provide a control voltage proportional thereto; and circuit means to apply said control voltage and an alternating voltage leading in phase by about one hundred electrical degrees the voltage applied to the anode of said second thyratron between the control electrode and cathode of said second thyratron.

5. For a system having an alternating current source, a load and means comprising a thyratron electron tube for applying unidirectional current to the load from said source, a control system for varying the voltage applied between the cathode and control electrode of the thyratron to control current conduction in said thyratron, comprising in combination, means connected to said load and being sensitive to the voltages thereacross to provide a feedback voltage proportional thereto, means to provide a unidirectional reference voltage, circuit means to compare said feedback and reference voltages and apply the difference therebetween between the cathode and control electrode of said thyratron, means to detect the amplitude of current flow in said load and provide a control voltage whose magnitude is proportional to said current flow, and means to interrupt said reference voltage when said control voltage exceeds a selected magnitude.

No references cited.